United States Patent [19]
Rioux et al.

[11] Patent Number: 6,016,487
[45] Date of Patent: Jan. 18, 2000

[54] METHOD OF SEARCHING THREE-DIMENSIONAL IMAGES

[75] Inventors: Marc Rioux, Ottawa; Eric Paquet, Thetford Mines, both of Canada

[73] Assignee: National Research Council of Canada, Ottawa, Canada

[21] Appl. No.: 08/824,289

[22] Filed: Mar. 26, 1997

[51] Int. Cl.[7] .................................................. G06F 17/30
[52] U.S. Cl. ........................................... 707/2; 707/3
[58] Field of Search .................. 707/3, 4, 5, 6, 707/2, 1, 104

[56] References Cited

U.S. PATENT DOCUMENTS

| | | | |
|---|---|---|---|
| 5,499,360 | 3/1996 | Barbara et al. | 395/600 |
| 5,579,471 | 11/1996 | Barber et al. | 395/326 |
| 5,644,765 | 7/1997 | Shimura et al. | 395/615 |
| 5,652,881 | 7/1997 | Takahashi et al. | 395/615 |
| 5,781,899 | 7/1998 | Hirata | 707/6 |
| 5,819,286 | 10/1998 | Yang et al. | 707/104 |

*Primary Examiner*—Paul V. Kulik
*Attorney, Agent, or Firm*—Neil Teitelbaum & Associates

[57] ABSTRACT

In the past, databases containing three dimensional images were searched by keywords and indexes. For such functionality, a set of keywords must be associated with each image. This is usually performed by a person and is prone to errors. It has now been found that searching of three-dimensional images stored electronically can be performed in dependence upon a variety of criteria such as colour, shape, size, etc. A method is disclosed for searching three dimensional images of objects in dependence upon the above criteria, other images, or other criteria. This obviates the need for keyword indexing of image databases.

23 Claims, 6 Drawing Sheets

METHOD OF SEARCHING THREE-DIMENSIONAL IMAGES

FIELD OF THE INVENTION

This invention relates generally to image analysis and more particularly to searching of images in dependence upon image data.

BACKGROUND OF THE INVENTION

In the past, the searching of images has been performed by searching text information associated with a particular image. Examples of text information associated with images include date, photographer, subject, view, time, etc. When searching for an image of oneself as a child, one searches images associated with keywords indicative of oneself from dates corresponding with one's childhood. Text based searching, or keyword searching is a very common searching technique for information, images, data, etc.

Recently, it has been found that keywords inadequately define images. Keywords partially define search criteria, often insufficiently. For keywords to fully define search parameters, a very large number of keywords is necessarily associated with each image or photograph. Returning to the above example, when searching for an image of oneself as a child in a particular room, with a particular toy, wearing a particular outfit, and where certain pieces of furniture are visible, it is unlikely that keywords pertaining to such elements are associated with any of the images. Therefore, in order to perform the search, a number of images are identified and then each image is reviewed by a person to identify the further criteria and select those images that match the criteria. For vast image databases, the above method is prohibitive.

Thus, it is evident that though keyword searching is an extremely powerful tool, when applied to images, it is limited in applicability to those elements for which keywords are associated with the images.

It is also evident that the above description is limited to situations where keywords are correctly entered. Errors in keywords result in misfiling of images.

In an attempt at overcoming these and other drawbacks in keyword searching, it has been suggested to search pictures using a picture as the search criteria. Using such a system, a search criteria image is analysed for colour, composition, contours, etc. and the results are compared against results of similar analyses performed on stored images. Images with results similar to those of the search criteria image within predetermined limits are selected as results of the search.

Searching two (2) dimensional images also has drawbacks. A bi-dimensional image does not have scale unless calibration is performed during image acquisition. Occlusion—hiding or obstruction of objects—and auto-occlusion—hiding or obstruction of portions an object by other portions of a same object—result in the loss of a significant fraction of available information. An object has a position and orientation that are easily varied and difficult to analyse. Entire images are often oriented differently, due to camera skew, complicating analysis. Most geometrical information is lost in capturing a two (2) dimensional image. This information is difficult to reconstruct absent quite a few assumptions or known parameters. Two (2) dimensional imaging is also affected by lighting. Light casts shadows that affect the perceived image. Careful colouring of an object renders it larger or shaped differently within a two (2) dimensional image. Old movie producers took advantage of this and painted sets for backdrops instead of moving film equipment to a different location. On film, it is difficult to distinguish a well painted set within a single frame, and a real "on-location" background.

Searching and locating two (2) dimensional images may have many applications. Unfortunately, it does not allow for recognition of objects or detection of similar objects within images except with regards to a particular view of the objects.

OBJECT OF THE INVENTION

It is an object of this invention to provide a method for searching a plurality of three-dimensional images in dependence upon image data search criteria.

STATEMENT OF THE INVENTION

In accordance with the invention there is provided a method of locating a three-dimensional model of an object comprising the steps of:

providing a first three-dimensional search model of an object;

determining substantially rotationally and translationally invariant values corresponding to the first three-dimensional model; and, using a processor, searching for models in a database associated with similar substantially rotationally and translationally invariant values within predetermined limits to those of the first model.

In an embodiment the directional information is determined such that it is unique to the first model and independent of model orientation. One method of determining directional information is determining orthogonal tensors of inertia in dependence upon the first model having a substantially uniform mass distribution.

In a further embodiment the step of determining substantially rotationally and translationally invariant values in dependence upon the first three-dimensional model comprises the steps of:

determining three tensors of inertia of the model that are orthogonal to each other in dependence upon the search model having a uniform mass distribution;

determining eigen values of the tensors of inertia;

identifying each tensor of inertia in dependence upon the eigen values; and, in dependence upon geometric information of the model, orienting each tensor of inertia in one of the direction of the tensor of inertia and a second direction 180 degrees from the direction of the tensor of inertia.

In accordance with the invention there is provided a method of locating a three-dimensional model of an object in a database of scanned three-dimensional models of objects, predetermined characterisations thereof, and associations therebetween comprising the steps of:

providing a first three-dimensional search model of an object;

determining substantially rotationally and translationally invariant values corresponding to the first three-dimensional model;

in dependence upon the rotationally and translationally invariant values, characterising the first three-dimensional search model to produce a plurality of search characterisations;

locating, with a processor, predetermined characterisations within the database in dependence upon the plurality of search characterisations; and, providing, an indication of the scanned three dimensional model associated with the located predetermined characterisations.

In accordance with the invention there is provided a method of locating a three-dimensional model of an object comprising the steps of:

providing a first three-dimensional search model of an object;

determining first substantially rotationally and translationally invariant values that correspond to the first three-dimensional model;

providing a second three-dimensional search model;

determining second substantially rotationally and translationally invariant values that correspond to the second three-dimensional model; and, using a processor, searching for models in a database associated with rotationally and translationally invariant values between the first substantially rotationally and translationally invariant values and the second substantially rotationally and translationally invariant values.

In an embodiment, the first three-dimensional search model comprises colour information relating to the object's colour.

In an embodiment, the substantially rotationally and translationally invariant values are tensors of inertia determined in dependence upon the first model wherein the tensors of inertia are linearly independent with respect to each other.

It is an advantage of the present invention that keyword indexing of images is not necessary in order to search and retrieve images from a database of images.

BRIEF DESCRIPTION OF THE DRAWINGS

Exemplary embodiments of the invention will now be described in conjunction with the attached drawings, in which.

DETAILED DESCRIPTION

Three (3) dimensional imaging is very different from two (2) dimensional imaging. In three (3) dimensional imaging, scale is known and since a model is constructed by integrating many views, the model constitutes a near complete representation of an original object. With lighting control, true colour of the object is ascertained at virtually every location on the surface. Consequently, few problems related to occlusion, auto-occlusion, shadowing, scale, or other limitations known to affect two (2) dimensional searching arise. Finally, nearly all the geometrical information relating to an object is available in stored images and therefore, search criteria is easier to specify and analyse.

Not all three (3) dimensional images are constructed by integrating views. Some three (3) dimensional images are single views captured in three (3) dimensions. Such views suffer some of the drawbacks of two (2) dimensional imaging, such as auto-occlusion, but not others such as unknown scale. The method according to this invention is described with reference to three (3) dimensional images constructed by integrating views. Alternatively, the method described herein is applicable in part to partial three (3) dimensional images or three (3) dimensional images wherein only a single view is captured.

When analysing two (2) dimensional images, orientation is significant to the analysis. The orientation of a line horizontally, instead of vertically, makes an image different. Search algorithms for use with two-dimensional images, are often executed in dependence upon orientation.

When orientation independence is desirable, for example in machine vision applications, a two-dimensional or three-dimensional view of an object is compared to known criteria to determine which object is viewed. For a surface mount assembly device, a distinction between resistors and different integrated circuit package sizes is sought. In assembly applications, part orientation is significant given a known or small set of known parts. As a first step to addressing the issue of part orientation, machine vision applications require that parts be imaged in an orientation falling within predetermined limits. The vision system is, therefore, used more to align an object than to reorient it.

In order to achieve true orientation independence, it has been suggested to mathematically transform the image of the object into a rotation independent value and compare this with other rotation independent values associated with parts. For non-symmetrical parts, this results in a value for each view of a part. Here, each view is determined in dependence upon an acceptable variation in the rotationally independent value. As is evident to those of skill in the art, a large number of values is required for each part. Once rotation invariance is achieved over a single criterion, other criteria are analysed in an orientation dependent manner.

An often-used method of identifying a part imaged by a transducer is set out below. An image is captured in two or three dimensions. Often two-dimensional imaging is used because of its low cost. Recently, however, advances in three (3) dimensional imaging allow for cost-effective three (3) dimensional imaging systems. Objects within the image are extracted using a blob finding or other known technique. Each object is analysed to determine a rotationally invariant criterion that is compared against similar criteria associated with computer models or definitions of parts. A small subset of parts is identified that is associated with rotationally invariant criteria matching the rotationally invariant criteria of the imaged object. The models are then transformed in a variety of orientations and images of the parts generated once each transformation is complete are compared to the imaged object. When a part matches the object within predetermined limits, the imaged object is identified, as is its orientation for facilitating machine grasping of the object.

The above method is excellent for identifying assembly parts. Many parts are computer designed therefore models exist. Many parts in use in manufacturing have regular or somewhat regular shapes and often incorporate significant symmetry. Further, most manufacturing processes identify a very small (<<100) number of different parts with machine vision. When a greater number of parts is intended for identification, further restrictions on part orientation, location, or identification are added. This is the case for surface mount assembly devices where part location and identification are known and only orientation is performed by a machine vision system. When the number of unknowns and the number of available parts increases, the methods employed in machine vision systems are slow and cumbersome. Whereas rotational invariance can reduce a model set by a factor of 10, thereby reducing the number of direct comparisons in a machine vision application to less than 10, in searching image databases, this can result in a subset of millions of images. Direct comparisons of millions of images are impractical.

Further, in machine vision applications, a goal of part identification requires a single fit within predetermined limits and no other such fit. In searching three (3) dimensional images in a database, any number of images may match and form part of search results. For machine vision, tuning of a system is performed during design and during installation; once operational, it is known how well a system functions. In searching an image database, personal preferences and other search criteria are necessarily supported to increase application flexibility. For these reasons, technical and other advances in machine vision are likely inapplicable to searching three (3) dimensional image databases.

In order to accomplish searching of a three (3) dimensional database, a series of criteria is extracted from a three (3) dimensional search criteria image. These criteria are then compared to similar criteria extracted from stored three (3) dimensional images of objects or from other captured three (3) dimensional images.

Figure 1:
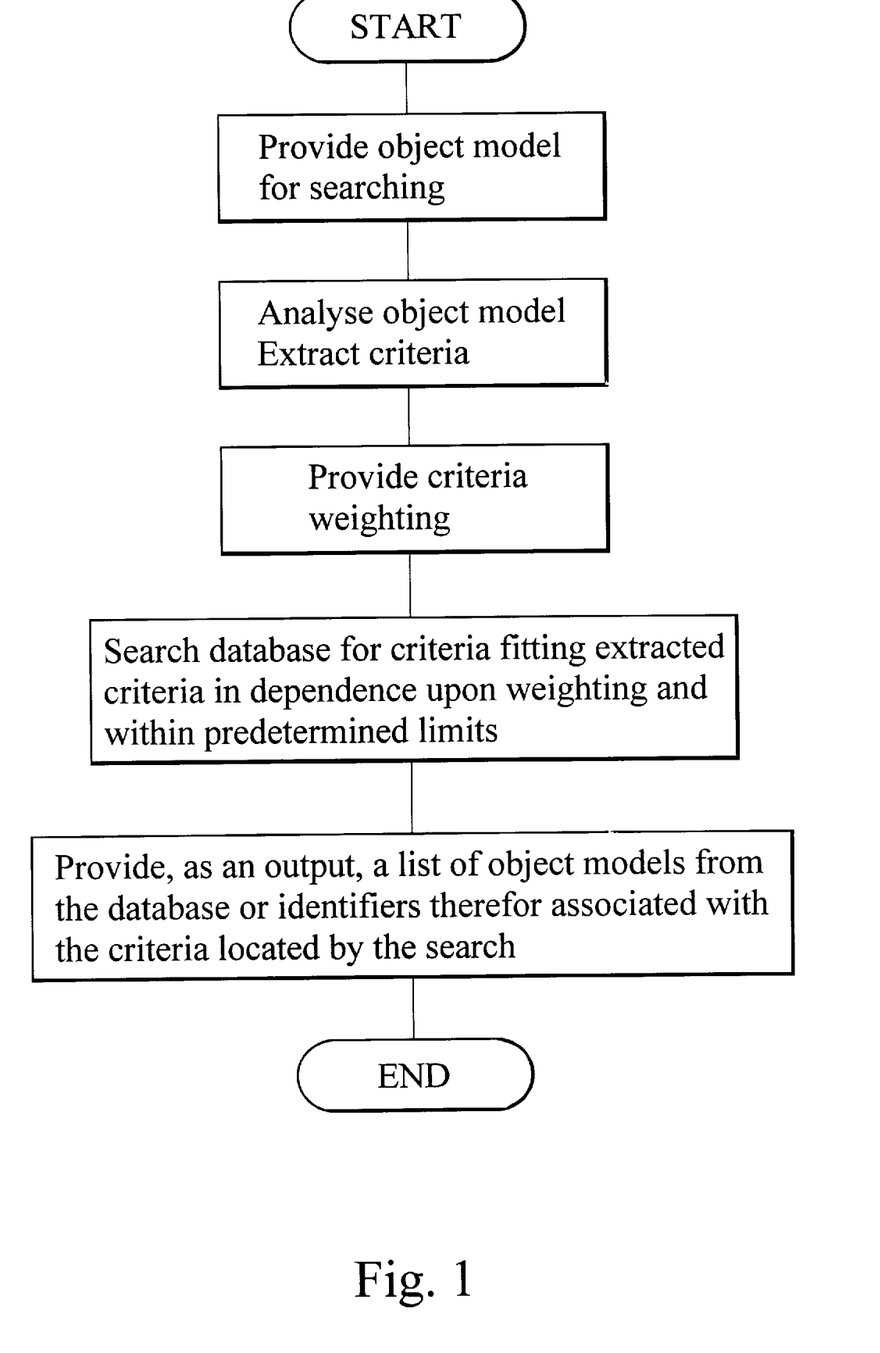
FIG. 1 is a simplified flow diagram of a method of performing a search of a plurality of three (3) dimensional images.

Referring to FIG. 1, a flow diagram of a method of performing a search of a plurality of three (3) dimensional images in the form of a database of object models is shown. Preferably the object models in the database are formed by scanning or imaging objects using a transducer. Preferably, the object models are analysed to extract search criteria in advance of searching the database.

An object model is provided to a processor. Object models are often formed by scanning or imaging an object. Object models are also designed electronically, variations of scanned or electronically designed object models, and combinations of object models. Some examples of object models provided to the processor as search criteria include an imaged plate of mushrooms, a computer aided design definition of a plate, an imaged mushroom superimposed on a plate, a mushroom scaled to the size of a house, a plate cut into pieces, pieces of a broken plate imaged and modified to form a three (3) dimensional image of an unbroken plate, a series of regular solids located in a predetermined spatial relation, etc.

The provided object model is analysed to extract search criteria. The analysis comprises analysis of scale, colour, and geometry. Preferably, the analysis is performed independent of the object model orientation. This reduces likelihood of incompatible search criteria.

A weighting of criteria is provided to the processor. For example, when the model is formed by re-sizing an image of an object, scale is important and is assigned significant weight. When a similar but not identical object is sought, for example as a decorative piece, size and colour receive more weight than geometry. Alternatively, the weighting is provided in advance of analysis.

The processor searches the database of object models. When the criteria are extracted in advance, criteria are searched for those matching the weighted criteria determined for the search object model. Alternatively, each object model is analysed in dependence upon the search criteria and weighting to locate close matches. Further alternatively, a combination of the two searches is employed wherein a coarse search is provided in dependence upon the search criteria and then, once narrowed, a detailed search comprising further analysis is employed. Searching techniques and hashing algorithms for searching numerical data are known and many such techniques are applicable to the present invention.

Once some object models are identified having search criteria that match the weighted search criteria within predetermined limits, those models or identifiers thereof are provided to an output device. Preferably, the object models are ordered in dependence upon rank or closeness of criteria to the weighted criteria.

As is clear to those of skill in the art, the characterisation process for identifying and extracting criteria from three (3) dimensional images is critical to adequately identifying three (3) dimensional object models as desired. The analysis is discussed in greater detail hereinbelow.

Geometry

Analysis of geometry is capable of being performed at three levels: local, regional and global. Global analysis concerns a whole object or model and is useful in determining a reference frame for use in local and regional calculations. A local feature is a very small portion of an object or model, for example, a normal at a given point. A regional feature varies slowly inside or over a region of the object or model. Other criteria that are applicable at all levels are entropy, complexity, and volume.

The object model is in a known format. Some examples of formats for three (3) dimensional object models include elementary shapes such as cubes, cylinders, and spheres; Bezier surfaces; derivatives of surfaces such as NURBS; clouds of points; quad-meshes; and triangles. These formats for object models are not incompatible one with another and, therefore, triangles or triangular solids are used for the exemplary embodiment described below. Of course other three (3) dimensional modelling formats are equally applicable. Reducing an object model or scanned image to triangles or triangular solids is performed, for example, by using Open Inventor® or Imageware®-commercially available software packages. Alternatively, another software package or a dedicated software routine is employed.

Figure 2:
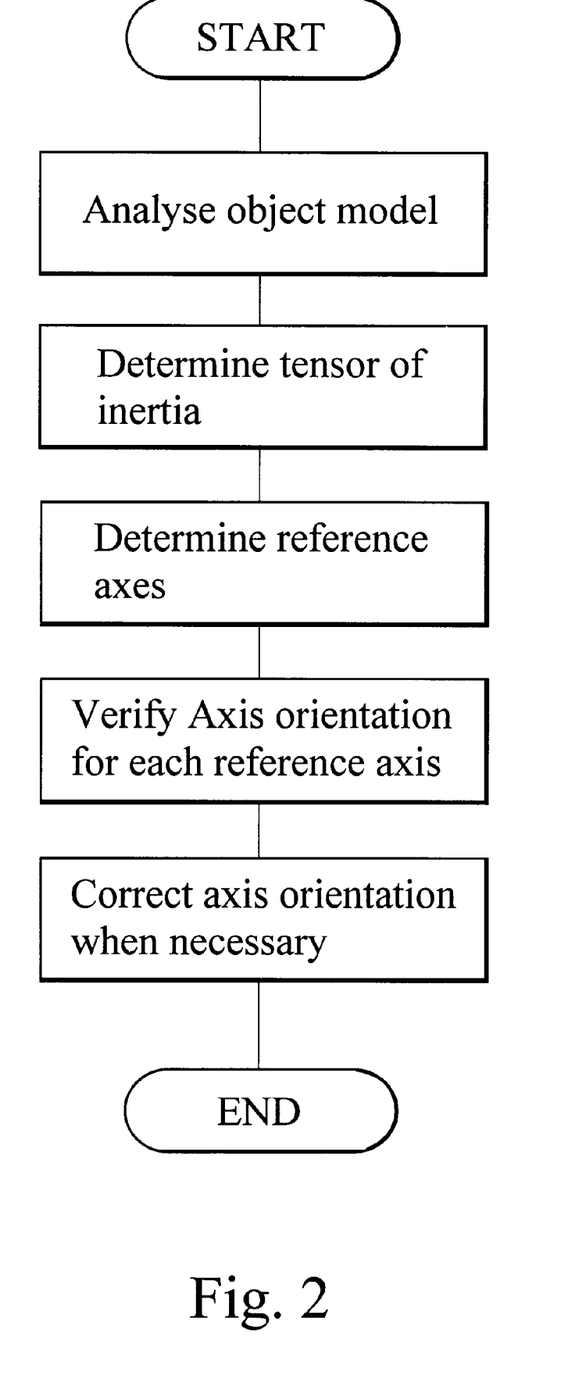
FIG. 2 is a simplified flow diagram of a method of extracting criteria from a three (3) dimensional image.

Referring to FIG. 2, a flow diagram of a method of extracting criteria from a three (3) dimensional image is shown. Each triangle is represented by a point and a weight. The point is at the centre of mass of the triangle and it is given by $$|r\rangle = \frac{1}{3}\begin{bmatrix} x_1 + x_2 + x_3 \\ y_1 + y_2 + y_3 \\ z_1 + z_2 + z_3 \end{bmatrix}$$

and the weight is equal to the area of the triangle $$w = \frac{1}{2}\|(|r_3\rangle - |r_1\rangle) \times (|r_2\rangle - |r_1\rangle)\|$$

where the operator x represents an outer product and $$|r_q\rangle = \frac{1}{3}\begin{bmatrix} x_q \\ y_q \\ z_q \end{bmatrix}$$

Frame of Reference

In order to analyse a model for use in searching a plurality of models, a reference frame that is comparable for models among the plurality of models is required. The reference frame permits the extraction of comparable criteria from each reference model within the database. Described herein is a reference frame that is dependent upon the object model and not on its orientation or translation. The reference frame results from a simple analysis of a tensor of inertia of the object model.

The tensor of inertia is defined as $$I = \begin{bmatrix} I_{xx} & I_{xy} & I_{xz} \\ I_{yx} & I_{yy} & I_{yz} \\ I_{zx} & I_{zy} & I_{zz} \end{bmatrix}$$

where $$I_{qr} = \frac{1}{n}\sum_{i=1}^{n}[(q_i - q_{cm})(r_i - r_{cm})]$$

and where q and r are equal to x, y or z. The tensor is symmetric. Axes of reference are the principal axes of the tensor and satisfy the following equation $$I|a_i\rangle = \lambda_i |a_i\rangle$$

where $|a_i\rangle$ is an eigen vector and $\lambda_i$ is the corresponding eigen value. The axes are labelled from one to three, in decreasing order of their eigen values. Once the axes are identified, a direction is required to determine a comparable frame of reference. One obstacle to determining a direction is mirror symmetry because the tensor of inertia remains unchanged when one of x, y and z is replaced by a corresponding one of −x, −y and −z. The direction of the axes is defined by determining a standard deviation of cord distribution. Within this disclosure, a cord is defined as a vector from the centre of mass of an object model to a point on a surface of the object model. In order to determine cord distribution, a distance between some points and the centre of mass is determined. Angles between cords and each of two axes are also determined. For each axis, points are divided into two groups—for example, "North" and "South." A point falls within the North group when the angle between the axis and the cord to said point is smaller than 90° and within the South group when the angle is greater than 90°. A standard deviation for length of the cords is calculated for each group associated with a particular axis. The calculation of standard deviations is well known in the art of statistics and probability.

When the North group of a given axis has a higher standard deviation, the direction of the corresponding eigen vector is not changed; otherwise, the direction is reversed—flipped by 180°. This determination of axis direction is applied to two axes. The outer product between them is then determined and, when the third axis does not have the same direction as the resulting vector, its direction is reversed—flipped by 180°—thereby ensuring a direct orthogonal system. Once a comparable reference frame for analysis of all object models within a database is determined, three (3) dimensional object models as well as other descriptors are useable as search criteria. Further, searches of three (3) dimensional object models are rotationally and transitionally invariant to some extent.

Scale

Figure 3:
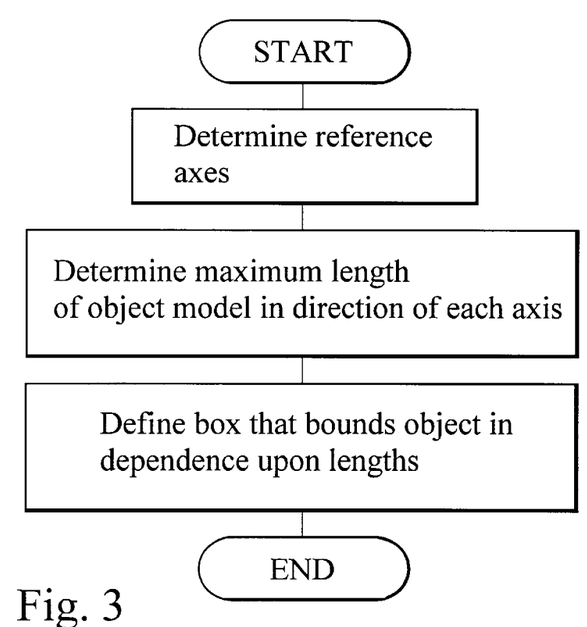
FIG. 3 is a simplified flow diagram of a method of determining scale.

A simple but useful parameter for a query by content search of a plurality of three (3) dimensional images is scale. The scale refers to the size or dimensions of a three-dimensional model. By using only the scale of an object model, a plurality of images are rapidly scanned, thereby concentrating the search on object models having dimensions within predetermined limits. A method of determining scale is shown in FIG. 3. A bounding box, the minimum size box containing an object and aligned with the reference frame, is determined. In order to facilitate computations and thereby improve performance, the bounding box is restricted to specific axes. The axes of the object model as determined above, are acceptable axes. It is apparent to those of skill in the art that fixed axes—not relative axes—are not used because object model rotation results in bounding boxes having different sizes.

A bounding box provides no information about mass distribution within. In order to increase the information relating to scale, distribution of mass inside the bounding box forms part of the scale. A rough description of the mass distribution is obtained from eigen values of the tensor of inertia as defined above. These eigen values correspond to the inertia of the object model about the axes defined by the eigen vectors. Alternatively, mass distribution is not used in determination of scale.

Alternatively, a bounding sphere is used having a radius equal to half of the longest axis of the object model. Such a sphere requires no orientation considerations and is completely rotationally invariant. As the bounding sphere comprises less information that a bounding box, it is less preferable for use by a search engine. Alternatively, other solids are used to determine scale.

Shape

Having defined some aspects of shape at a global level—the tensor of inertia and the bounding box—definition of shape at local and regional levels is performed. Dividing shape into global, regional and local features allows a search engine to compare global aspects of shape such as scale, tensors of inertia, and volume for each object model within a database rapidly. This results in a set of object models meeting within predetermined limits, the criteria of these global aspects of shape. The set likely is only a small subset of database of object models. Using the subset, more detailed comparisons are conducted to locate those object models meeting specified criteria.

An example of a local feature that is used in detailed comparisons is a normal. A normal is defined as a vector perpendicular a given triangles face and is given by:

$$|n\rangle = \frac{(|r_2\rangle - |r_1\rangle) \times (|r_3\rangle - |r_1\rangle)}{\|(|r_2\rangle - |r_1\rangle) \times (|r_3\rangle - |r_1\rangle)\|}$$

A subset of the normal vectors is determined. An angle between each determined normal and each of two axes of the reference frame is determined. Computing an angle between two orthogonal axes and a line obviates the need to compute an angle between the third orthogonal axis and the line, as evidenced from the cosine law. From the determined angles, histograms are produced. Three different types of histograms are optionally produced, and one or more is selected for comparison in dependence upon complexity of the object model. The angles between a normal and first and second axes, angles $\alpha_1$ and $\alpha_2$ respectively, are defined as $$\alpha_q = \cos^{-1}\left(\frac{\langle n | a_q \rangle}{\|\|n\rangle\|\|\|q_q\rangle\|}\right)$$

where q=1 or 2. The vertical scale of the histograms represents an occurrence of a given angle and the horizontal scale represents scale. The way in which the angles are mapped determines complexity of the description.

The histogram with the lowest complexity is defined as follows: $h(\alpha_q)$ where q is 1 and 2. This is referred to as a histogram of the first type. This histogram does not provide distinction between $\alpha_1$ and $\alpha_2$ and does not account for relations therebetween; it is useful for discriminating very different features. A histogram of the second type has two parts: one for each angle, thereby distinguishing between the two angles but not establishing any relation therebetween. It is a bi-dimensional histogram defined as follows: $h(\alpha_1, \alpha_2)$ and provides distinction between the angles and maps a relation therebetween.

Figure 4A:
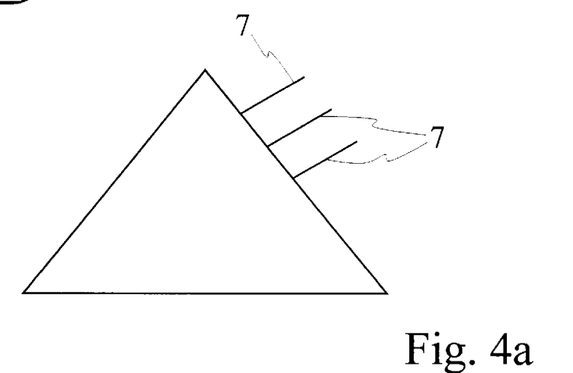
FIG. 4a is a diagram of a side of a pyramid.
Figure 4B:
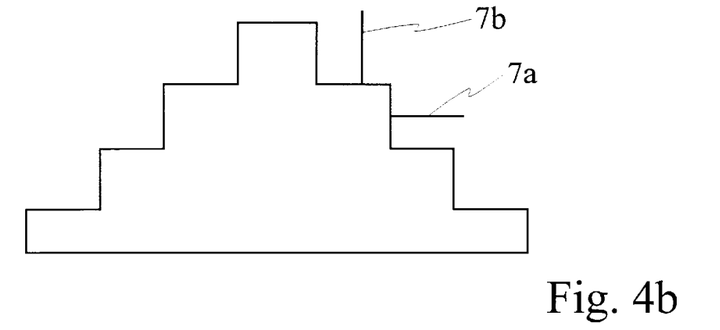
FIG. 4b is a diagram of a side of a step-pyramid.

Normals are sensitive to local variation of shape, which may result in erroneous search results. As an example, referring to FIGS. 4a and 4b, two shapes are shown. Though shown in two dimensions, the problems highlighted by these shapes are applicable in three (3) dimensions as well. FIG. 4a shows a view of a pyramid and FIG. 4b shows a view of a step pyramid. Likely, a search engine is intended to return one when presented with the other as a search criterion. Within predetermined limits, scale is of a same magnitude for the figures shown or for physical pyramids in Africa and South America. Shape is similar on a global scale with similar tensors resulting. However, for local details, when normals are analysed, significant differences result. Referring to FIG. 4a, the normals 7 along a side are parallel; similarly, for a pyramid, the normals along an entire surface are substantially parallel. The normals for the shape of FIG. 4b are in two different orientations shown by lines 7a and 7b; similarly for a side of a step pyramid normals have two orientations corresponding to the orientations of the steps. The histograms corresponding to these pyramids are distinct. In order to overcome this problem, regional features are analysed. For example, by also analysing cords, a vector from the centre of mass to a given point on a surface of an object model, having lengths and orientations a region is defined over which the cords vary in a substantially deterministic fashion. The result of regional analyses allows for a coarse comparison resulting in close correlation between pyramids and step pyramids.

Referring to the above example, the cord orientation changes slowly on a given region while the normal orientation has significant variations. As for normals, the statistical distribution of orientations is represented by three histograms namely: histogram of the first, second and third type. A cord has an angle and a length; its parameters are organised into histograms with a difference from those of the normals in that instead of representing an angle, the horizontal scale represents length of the cord. The histogram is optionally scale dependent or scale independent when scale is normalised. Scale independence provides the additional flexibility of weighting scale as unimportant and performing a search independent of scale related information.

Figure 5:
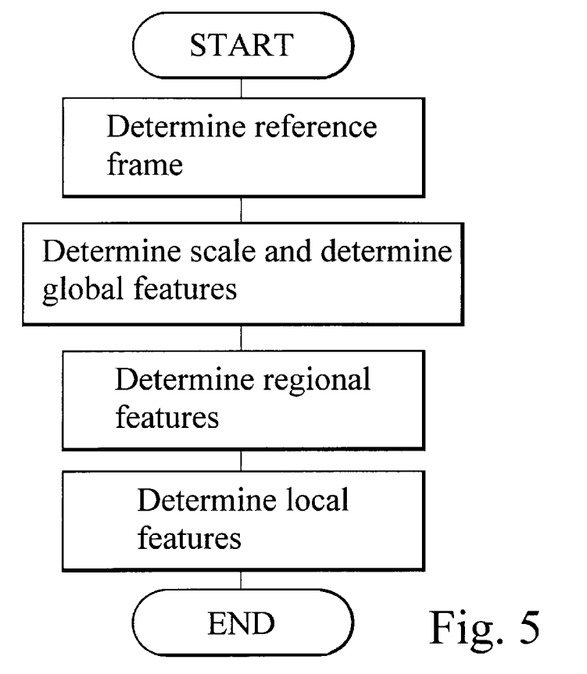
FIG. 5 is a simplified flow diagram of a method of analysing an object model shape.

Referring to FIG. 5, a flow diagram of a method of analysing an object model shape is shown. The object model is analysed to determine a reference frame. Global features such as scale, volume, etc. are extracted. Regional features are extracted. Local features are extracted. It is evident that with the exception of determining a reference frame, each of the steps is performed in any order or in parallel except where results of other steps are necessary to determinations of a present step.

Volume

Above, the object model is defined as surfaces containing an object. Though this is how objects are appreciated visually, it is not necessarily a best or only method of analysing an object model. A three (3) dimensional object model defines a volume. In a three (3) dimensional discrete representation, building blocks are referred to as voxels, a short hand for volume elements. A voxel, like a pixel, represents a discrete point; however, a voxel has three dimensions. Using a voxel a three (3) dimensional model is binarised losing a small amount of information. The object model'co-ordinates are mapped to discrete voxel co-ordinates $$\begin{bmatrix} x \\ y \\ z \end{bmatrix} \Rightarrow \begin{bmatrix} i\Delta_x \\ j\Delta_y \\ k\Delta_z \end{bmatrix}$$

where the $\Delta$'s are dimensions of a voxel and i, j and k are discrete co-ordinates. When the density of points in an object model is insufficient, interpolation of the model is necessary to generate more points and to obtain a better description in voxel space. It is always a good idea to interpolate an original object model in order to minimise any discrepancy between a "standard" representation and a voxel representation. Interpolation of object models is known in the art and is, therefore, not discussed further. It is evident to those of skill in the art that the use of a same interpolation algorithm for all object models within a database is preferred.

Below, a method is described for analysing a voxel representation using a wavelet transform. Alternatively, other methods of analysis are used. The wavelet approach has several known advantages and many proposed advantages. Recent experiments tend to demonstrate that the human eye performs a pseudo wavelet transform. As human eyes and brains are already capable of matching three (3) dimensional objects very effectively, the algorithm for matching three (3) dimensional object models described herein attempts to mimic the human system.

The wavelet transform results in a multi-scale analysis. Multi-scale as used herein refers to analysing an object model at different levels of detail. A fast transform implementation of the wavelet transform allows rapid calculation and thereby increases efficiency. The fast wavelet transform is an orthogonal transformation having an orthogonal base. The elements of the base are characterised by scale and position. Each element of the base is bounded in space and occupies a well defined region.

The analysis performed with the wavelet transform is, therefore, local and the size of the analysed region is dependent upon a scale of the wavelet. A one-dimensional wavelet is defined as $$\sqrt{2^j}\, w(2^j q - n)_{nj \in Z}$$

For the present embodiment, DAU4 wavelets having two vanishing moments are used. An N×N matrix corresponding to a one dimensional transform is formed, where N is a multiple of 2. Elements in the matrix are defined as positive and negative values of $C_0$, $C_1$, $C_2$, and $C_3$ where these are defined as follows:

$$C_0 = \frac{1+\sqrt{3}}{4\sqrt{2}}, \quad C_1 = \frac{3+\sqrt{3}}{4\sqrt{2}}, \quad C_2 = \frac{1-\sqrt{3}}{4\sqrt{2}}, \quad \text{and } C_4 = \frac{11\sqrt{3}}{4\sqrt{2}}$$

The matrix is implemented as a quadrature mirror filter defined as follows:

H∴[$C_0$, $C_1$, $C_2$, $C_3$]
G∴[$C_3$, $-C_2$, $C_1$, $-C_0$]

H is a smoothing filter while G is a filter with two vanishing moments. The one dimensional wavelet transform is computed by applying the wavelet transform matrix hierarchically, first on the full vector of length N, then on the N/2 values smoothed by H, then on the N/4 values smoothed again by H until two components remain. In order to compute the wavelet transform in three (3) dimensions, the array is transformed sequentially on a first dimension for all values of its other dimensions, then the array is transformed sequentially on its second dimension and, then the array is transformed sequentially on its third dimension. Alternatively, the transforms are performed in parallel or in another order. The result of the wavelet transform is an array having a same dimension as the initial voxel array.

A set of wavelet coefficients represents a significant amount of information. A logarithm in base 2 of the coefficients is calculated in order to enhance the coefficients corresponding to small details which usually have a very low value when compared to other coefficients. A total signal for each level of detail is determined by integrating a signal inside a corresponding box. A histogram representing the distribution of the signal at different levels of detail is then constructed: the vertical scale relates to a total amount of signal at a given level of detail and the horizontal scale relates to level of detail. Each indication of level of detail is determined in dependence upon three level of detail factors —one for each axis.

Colour

Colour, though unique, is only one of several factors that contribute to appearance. Shadows are significant to our appreciation of space and affect colour as viewed. This renders two (2) dimensional images difficult to search in light of true shape or colour. Unfortunately, when imaging in three (3) dimensions and gathering true colour information, often, an object can not be displayed as it appeared without some physical texture related information. Small cracks, bumps and other patterns on a surface of an object result in shadows and lighting variations that affect appearance. As an example, a polished flat metal surface appears reflective. Add to that surface a fine textured granularity, and the surface appears as a non-reflective metal surface. Therefore, colour is often analysed in conjunction with material properties and other appearance related information.

Colour criteria is often defined through numerical representations of colours. These representations are known. Common representations include RGB (red-green-blue) and HSV (hue-saturation-value). RGB colour representation is an orthogonal mapping of the red, green and blue colour components. HSV colour representation is a cylindrical mapping of the red, green and blue colour components.

Colour is modelled either in dependence upon geometry or independent of geometry. Both techniques are equally applicable and a combination of the techniques is also useful. Colour distribution and geometry are often considered as two totally distinct entities. This is not true because colour is carried by a physical object and has co-ordinates on that object; colours are linked to geometric information of an object. Nevertheless it is extremely convenient, when one is not interested in positions of the colours on a surface of an object, to ignore any correlations between colour and geometry.

Colour is modelled as a reaction of an object to its lighting environment. For example, in computer vision colour is described as a set of coefficients: diffuse colour, specular colour, and specularity to name a few. The diffuse colour is related to Lambertian behaviour of the object while the specular colour is a rough approximation of directional reflection. The specularity is related to a shininess of the object. The use of coefficients allows for description of an appearance of a given material.

For searching, a user determines whether an object made of gold, bronze or another substance is desired and enters the determination as a search criteria. A search of images is then directed to include the colour criteria as a search parameter. As colour information is unique in a three (3) dimensional image—in contrast to a two (2) dimensional image—a search criteria of this type is easily and effectively applied.

Figure 6:
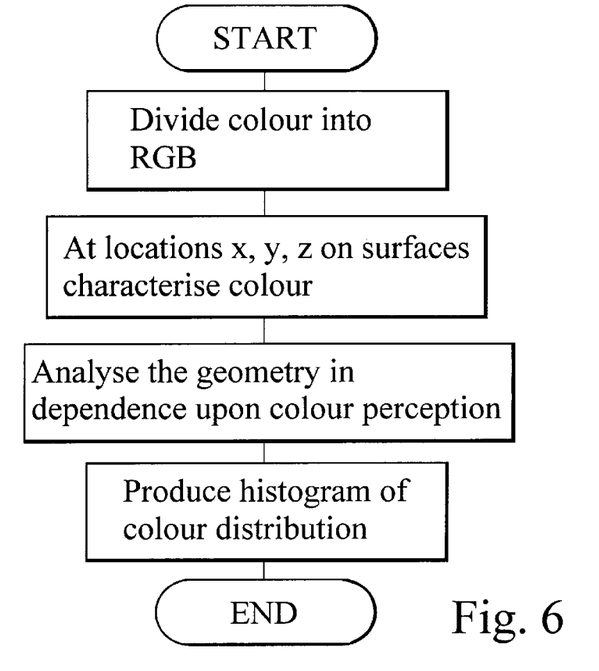
FIG. 6 is a simplified flow diagram of a method of characterising colour criteria in which colour information is characterised as a parameter within geometrical information.

Referring to FIG. 6, a simplified flow diagram of a method of characterising colour criteria is shown in which colour information is characterised as a parameter within geometrical information. This results from an extension to a wavelet analysis of three (3) dimensional images. It is described in detail in E Paquet, "Recognition of Polychromatic Range Images based on Chromatic Sampling of Scalar Products and Logarithmic Histograms", accepted in the International Journal of Optoelectronics (1996) which is hereby incorporated by reference. A model is mapped onto a discrete six-dimensional grid—xyzRGB. A wavelet transform is computed and a multi-resolution statistic is presented in the form of a histogram. As colour is a unique criteria, the model colour is known and is combined with a texture description to obtain a "physical" colour description.

One of the most widely used lighting models in computer graphics is the Phong model. This model has shown itself to be quite effective in describing almost any kind of material with a set of seven coefficients: three for diffuse colour, three for specular colour and one for reflectivity. By computing the values of these coefficients, it is possible to describe a colour criteria distribution for the model. The Phong model is generally defined as $$I \approx I_S [r_d \langle s|n \rangle + r_S (\langle r|v \rangle)^f]$$

where $$|r\rangle = \frac{-|s\rangle + 2\langle s|n\rangle |n\rangle}{\| -|s\rangle + 2\langle s|n\rangle |n\rangle \|},$$

$|n\rangle$ is a unit normal at a given point, $|s\rangle$ is a unit vector from the same point to a light source, $|v\rangle$ is a vector in the direction of an observer, $|r\rangle$ is a unit vector indicating a direction of reflected light when material of a surface has perfect reflectivity, f is a measure of specularity for the surface, $I_S$ is a light source intensity, $r_d$ is diffuse reflectivity—often referred to as diffuse colour—and $r_s$ is specular reflectivity. The diffuse reflectivity is a Lambertian part of reflected light while the specular reflectivity depends on a direction of observation. There are diffuse and specular reflectivity coefficients for red, blue and green component of the light. Such a lighting model is a rough approximation of true lighting; nevertheless, the model effectively represents different types of material. It is thus possible to identify a given material M by a set of seven coefficients $$M \therefore [R_d G_d B_d R_s G_s B_s f]$$

where R, G and B represent red, green and blue. All these coefficients are defined over interval [0,1]. Alternatively, other intervals are used. For example, $f$ is sometimes defined over interval [0,128]. When the model is formed of one material, these coefficients constitute an acceptable definition of the material M; however, when the model is formed of a plurality of different materials, the materials' statistic is represented by a set of seven histograms.

$$M \therefore [h(R_d) \; h(G_d) \; h(B_d) \; h(R_s) \; h(G_s) \; h(B_s) \; h(f)].$$

The histograms—for an object or model comprising a single material these values—are then available for comparison by a search engine to analyse and locate histograms associated with similar three (3) dimensional images.

Figure 7:
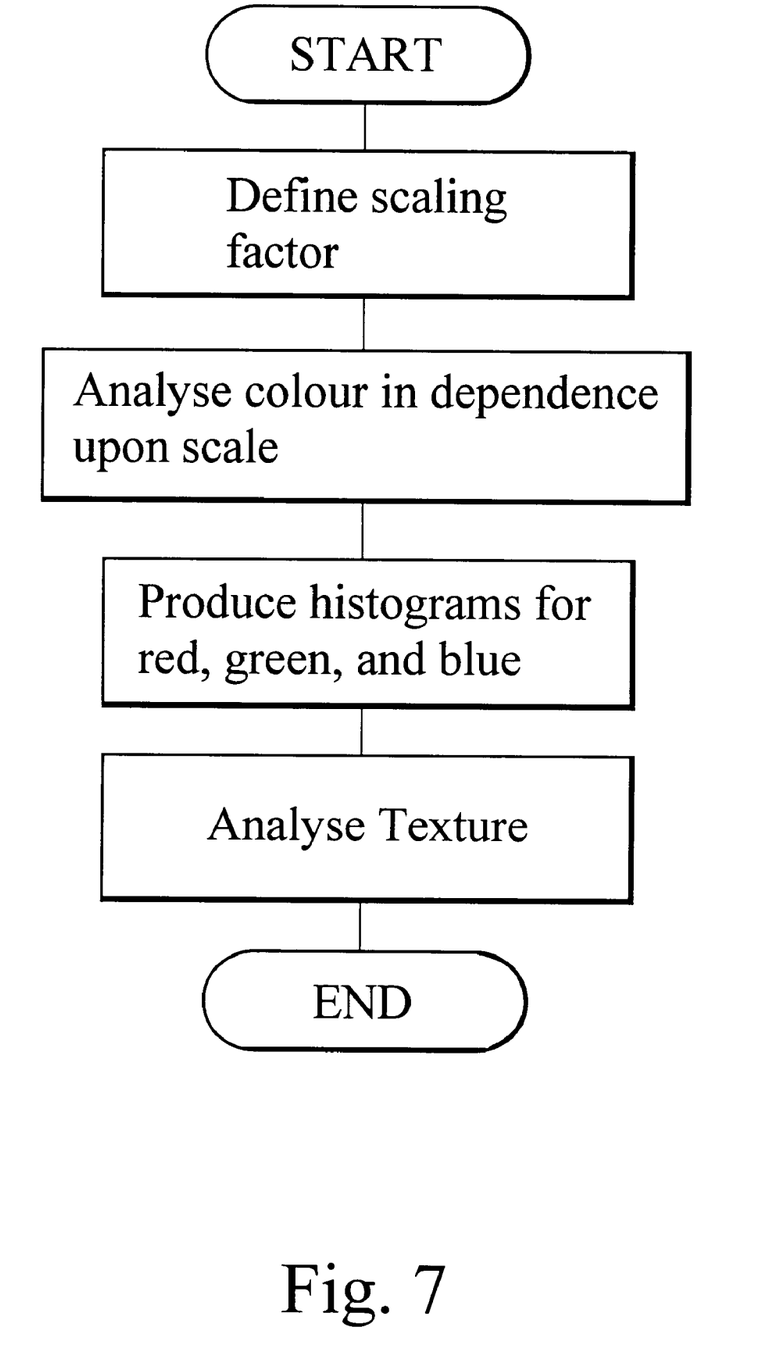
FIG. 7 is a simplified flow diagram of a method of characterising colour criteria in which colour distribution is considered as separate from geometrical information; and, FIG. 8 is a simplified flow diagram of a method of combining extracted criteria to perform a more flexible search.

Referring to FIG. 7, a simplified flow diagram of a method of characterising colour criteria is shown in which colour distribution is considered as separate from geometrical information. The colour criteria results from an analysis of a colour histogram for the red, green and blue distribution. This is discussed in H S Sawhney and J L Hafner, "Efficient Colour Histogram Indexing", IEEE International Conference on Image Processing, pp. 66–70 (1994) which is hereby incorporated by reference.

When location of colour is unimportant, the description of a colour distribution is straightforward. A colour histogram is computed for red, green and blue. The vertical scale of these histograms corresponds to an occurrence of a given colour while the horizontal scale represents normalised intensity of the colour. The only complexity that is introduced is that of shading. For decorative purposes and colour matching, it is often best to determine a shaded colour appearance. Alternatively for other applications, "true colour is preferable. Therefore, in determining red, green, and blue components of colour, a decision is made regarding application of shading.

When the location of the colour is important as shown in FIG. 7, a wavelet approach is generalised to apply to colour wherein, for example, a six dimensional model is used; the dimensions are x, y, z, R, G, and B. First, the model is binarised $$[xyzRGB] \Rightarrow [i\Delta_x j\Delta_y k\Delta_z l\Delta_R m\Delta_G n\Delta_B]$$

A six-dimensional wavelet transform is performed. An array is transformed sequentially on a first dimension for all values of its other dimensions, then on a second dimension, . . . up to a sixth dimension.

The logarithm base two of the wavelet coefficient is computed and the total signal at each level of detail is determined by integrating the corresponding signal. A statistical distribution of the signal is produced in the form of a histogram. The horizontal scale of the histogram relates to level of detail and the vertical scale relates to a corresponding signal. Of note is that "scale" of the histograms is provided by combining levels of detail from each of the xyzRGB spaces.

A texture mapping technique applies a texture map to a rough geometrical description of an object. Since the map substantially describes a colour distribution, overlaying the colours in accordance with the texture produces the same image as a colour image stored with higher geometrical resolution. A low geometrical resolution allows for manipulation of an image or navigation through an image with less processing time than high geometrical resolutions. A texture map is usually a low resolution RGB mapping. Sometimes, texture is applied as a pattern that repeats itself on the object. The pattern constitutes the colour information or, alternatively, the pattern modulates an RGB distribution. The texture and the RGB distribution are analysed separately or as a whole by computing a modulated colour distribution.

With the recent developments in the art of texture mapping, texture is achieving some prominence. Most often, texture is analysed according to one of two models: as a pattern that is mapped on an object or as a complete colour description of the object. Often, texture is modelled as an intensity—RGB or RGBA (alpha: transparency)—image. For clarity, transparency is not discussed herein. Optionally, it is also used in texture characterisation. Often, texture is modelled using a bi-dimensional orthogonal system. Co-ordinates, S and T, are normalised. When the object model has a material description (M), the diffuse colour of the model is modulated by the texture $$\begin{bmatrix} R_{out} \\ G_{out} \\ B_{out} \end{bmatrix} = \begin{bmatrix} R_d R_{tex} \\ G_d G_{text} \\ B_d B_{tex} \end{bmatrix}$$

and separate analysis of the texture is unnecessary. When texture is the sole colour descriptor for an object model, a statistical description of colour distribution of the texture is formed by histograms of red, green and blue distribution. The material and the texture are a twofold manifestation of colour distribution. When both material and texture are available, preferably, an analysis is performed in dependence upon both. The distribution of colour information between material analysis and texture analysis is somewhat arbitrary, and division of the colour information is unlikely to be performed uniformly from one object model to another. This means that a given colour distribution has many texture-material manifestations. When analysed separately, two colour distributions that are similar may result in different textures and materials. For use in a search engine, this presents added complexity. Alternatively, analysis is performed independently of texture and then independently of material resulting in the aforementioned shortcomings.

Search Engine Parameters

Figure 8:
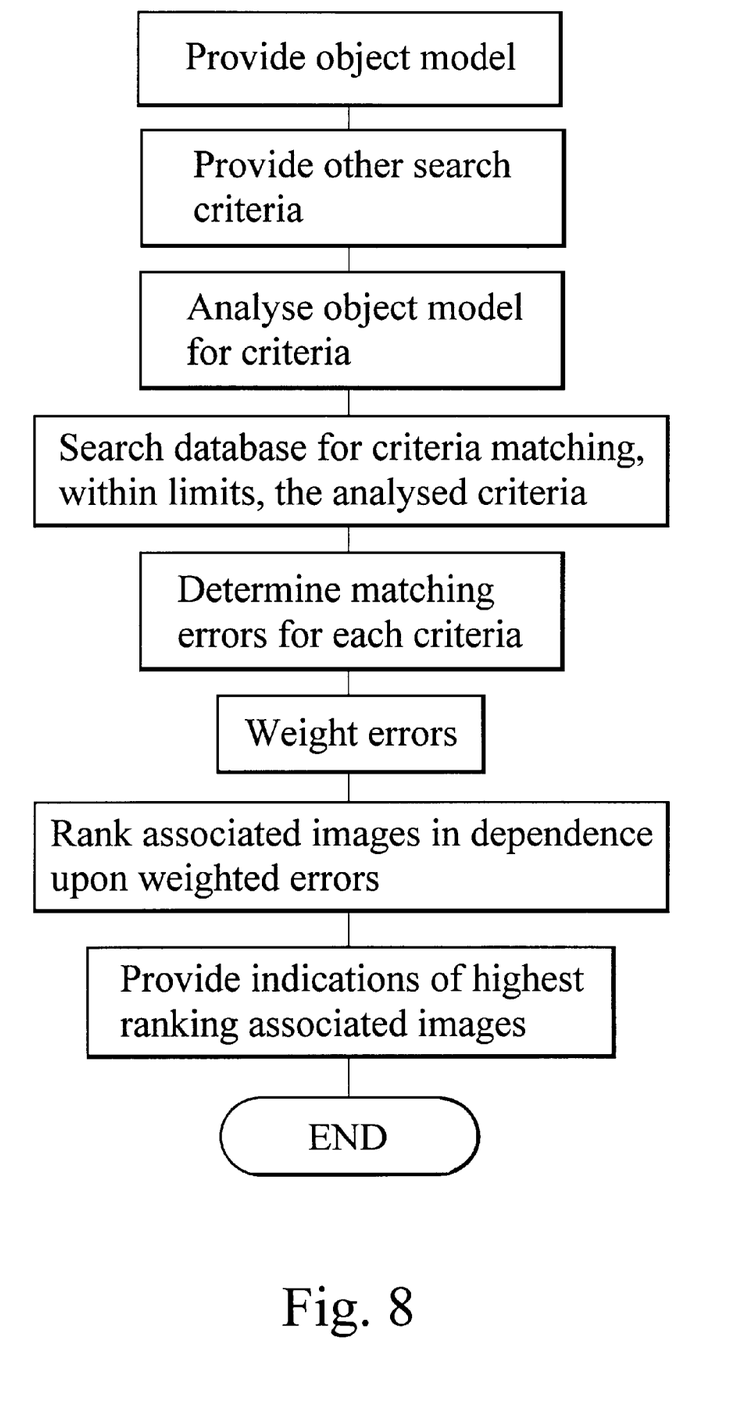

Referring to FIG. 8, a simplified flow diagram of a method of combining the above analyses to better perform a search is shown. Above, geometry and colour are analysed separately. In order to provide flexibility and effectiveness in searching of object models, it is necessary to combine search criteria for use in a single weighted search.

Weightings are commonly applied to errors or to correlations. In evaluating acceptability of an object it is common to state likes and dislikes. Errors and correlations are not necessarily equivalent when weighted. Referring to the first, a simple error weighting takes each weighting multiplied by the associated error, for example error in scale times scale weighting factor, and sums them. Averaging is optionally performed. Resulting error values are compared to limits to determine if the error is acceptable. When acceptable, an object model is located, otherwise it is passed over. A problem with this approach is that sensitivity of scale, shape and colour algorithms may vary. Thus, the criteria having a highest sensitivity dominates other criteria. Of course a scaling factor for error determination to compensate for sensitivity variation is possible, but may involve complex equations as sensitivity often varies in a non linear fashion.

When rank is used instead of error, classification is made separately for the scale, shape and colour and then rankings are grouped and weighted to determine a final ranking of object models. This eliminates relative sensitivity of the algorithms at the cost of some information. For example, a top ranked object model may be inappropriate. Using an error determination allows filtering of all object models as inappropriate.

Errors are computed by comparing two sets of histograms. Since the number of channels in each histogram is often low—typically in the order of thirty two—we compute the error as follows:

$$err = \sqrt{\sum_{i=1}^{n} [h_{input}(i) - h_{ref}(i)]^2}$$

So for an object model compared against itself, no error results. It is possible to correlate error values across criteria by modifying the search criteria object model in predetermined ways to determine a scale factor for each error weighting as applied to the specific search criteria. The error weightings are applied to corresponding error values in order to normalise the error values and thereby results in less sensitivity variations. Another, alternative is to have a series of predetermined object models for calibrating the error results in dependence upon error results from the object models and for determining a scale in dependence thereon.

Input Object Models

The input search criteria in the form of an object model is preferably a scanned three (3) dimensional image similar to those contained within the database. Alternatively, a variety of search criteria is employed comprising: computer designed models in the form of AUTOCAD models, two (2) dimensional images of objects, text descriptions such as "red sphere on a triangular base," a model obtained with the help of a three-dimensional sensor and then modified, a plurality of models each selected for one or more criteria, a plurality of models to define a range in which a criteria is acceptable, etc. Each is discussed in more detail below.

Searching for an object model in dependence upon an object model allows police to identify owners of registered stolen goods or museums to find information on their possessions. One method of achieving this is by scanning an object to form an object model and then using the newly created object model as a criteria for a search. Another application of this search criteria is locating object models in dependence upon a model that is already found. For example, a couch is located for electronic interior design. Unfortunately, it is too big. The same model is used as search criteria to locate a similar but smaller couch.

Using a CAD model allows for designs to incorporate commercially available parts from the outset. For example, when a hinge is required it is designed to meet several engineering and aesthetic requirements. Once designed, a search reveals similar hinges which are evaluated against the requirements perhaps allowing for use of an existing and, therefore, less costly hinge.

Text based searching is particularly applicable across the internet or other distant computer use where bandwidth is limited. Unfortunately, text based searching of three (3) dimensional objects is very limited. In the example above—"a red sphere supported by a triangular base"—red is any red or a single predefined colour red. The sphere is a sphere and the base is triangular but these must have further definitions. The appearance of an object so described may vary considerably and likewise, a search performed in dependence thereon will likely locate a greater number of object models than an image criteria based search. For some designs, however, the text based search is very applicable. For example, in searching for furniture for a child's room, search criteria such as "red, yellow, green and blue accents in the shapes of circles squares and triangles on a set of 5 drawers" are sufficient since an exact look is not required so much as a pattern of primary colours and simple shapes. Also, complex Boolean searching is possible using text in a similar fashion to images to denote limits. A search term such as "red squares or yellow squares or blue squares" or "squares having sides of between 1 and 3 inches (2.5 and 7.5 cm)" defines a range of three (3) dimensional image criteria.

Morphing is the alteration of a two (2) or three (3) dimensional image into another image. Varying an image to produce a different image is a significant advantage to the present invention. Returning to the example where the couch is too large (set out above). The couch object model is reduced in size to fit the space, a search is performed in dependence upon the morphed or transformed couch and resulting object models are then better suited for use in the interior design. A further application of morphing object models is in defining search ranges for object models. When a chair is desired between 2 and 3 feet across (60–90 cm), a chair object model is morphed to each of those limitations and the two object models are entered as criteria in the search engine. Only object models deemed to fall between each of the criteria object models are located and returned. The use of ranges also permits definition of relative scale. An object model chair having a length to width ration of x:y is designed. The relative scale is maintained in the morphed object model of the chair and relative scale is weighted heavily. As the height hasn't changed, chair height retains the weighting assigned to scale, only those aspects that have changed are subject to the relative scale weighting. Such features are applicable to searching for three (3) dimensional object models in dependence upon three (3) dimensional object models.

When different search images are entered as criteria, a great amount of flexibility ensues. For example, a vase is entered for shape, size, and geometry; a couch is entered for colour. Vases having an appropriate shape of the vase and colours of the couch are returned. Alternatively, a similar result is obtained by modifying a vase with a colour overlay from the couch to produce an object model of a desired vase and searching in dependence thereon.

The algorithms were applied to a database having more than four hundred object models. Each model comprises a single view scanned by a range laser camera. These models have no colour distribution information. The results indicate that searching in dependence upon geometry is fast and effective. Further, often the second or third highest ranked object model is that desired. This highlights the value in returning a group of located object models having the desired criteria.

The algorithms are applied to an object model database successfully. Results obtained are impossible using prior art keyword or image based analysis. Further, the algorithms disclosed herein have a reasonable tolerance against noise.

Alternatively, another method of defining a reference frame is used. An example of another method is orienting the reference frame about an axis passing through the longest dimension of the search image. Appropriate orientation algorithms are required to ensure correct orientation of the axis in light of symmetry or a plurality of equidistant dimensions.

In the appendix attached hereto is the following:

APPENDIX A

Psuedocode relating to an implementation of an embodiment according to the invention.

Numerous other embodiments may be envisaged without departing from the spirit and scope of the invention.

---

Nefertiti (pseudo-code)
© by Eric Paquet and Marc Rioux 1996
This pseudo-code has to remain strictly confidential
Visual Information Technology
Institute for Information Technology
National Research Council of Canada
Building M-50 Montreal Road, Ottawa, K1A 0R6
interface
    viewer
    lighting control
    color and material editor
    printing control
    reading a writing a file
    shape editor
    viewer
        stereo viewing
        translation
        rotation
        zoom
        view as
            shape and texture and color
            shape and color
            shape alone
            mesh
            point
            bounding box
    lighting control
        color
        intensity
        direction
    color editor
        color palette
        RGB sliders
        HSV sliders
    material editor
        materials list
        edition of material by the color editor
    printing editor
        Encapsulated PostScript (color or B/W)
        PostScript (color or B/W)
        RGB
    shape editor
        deformation of the model in a given direction
            by using a set of sliders
            by deforming the object directly with the mouse
calculation of the descriptors
    triangulation of the model
        from points to triangles
        from quad-meshes to triangles
        from shapes to triangles
        from NURBS to triangles
    center of mass and area of each triangle
    center of mass of the model
    tensor of inertia and eigen vectors of the model
    determination of a unique orientation for the eigen veccors based on
    the statistical distribution of the mass
    angular distribution of the triangles relative to the eigen vectors
        histogram of the distribution
    radial distribution of the triangles relative to the eigen vectors
        histogram of the distribution
    distribution of the normals
        histogram of the distribution
    binarization of the model (shape and color)
        six-dimensional voxels representation
        wavelet transform
            histogram of the distribution of the resolutions
    multiresolution distribution of the triangles
        histogram of the distribution
    segmentation of the model based on the color distribution
        distribution of the normals for each of three segmented model
            histogram of the distribution
    bounding box
Creation of an HTLM page
    with the input model
    options for the search
The server analyzes the request
    by comparing the input descriptor with the descriptors of the databases -continued an error is calculated in each case
all the errors are put in growing order
the result of the query is sent back to the user
A separate program can compute the descriptors (See description above) for each model of the database

What is claimed is:

1. A method of locating a three-dimensional model of an object comprising the steps of:
providing a first three-dimensional search model of an object, the three-dimensions being three spatial dimensions;
determining values corresponding to the first three-dimensional model that are substantially rotationally and translationally invariant in the three spatial dimensions; and,
using a processor, searching for three-dimensional models, the models comprising data relating to each of three spatial dimensions, in a database associated with similar substantially rotationally and translationally invariant values within predetermined limits to those of the first model.

2. A method of locating a three-dimensional model of an object as defined in claim 1 further comprising the step of:
determining directional information that is unique to the first model and independent of model orientation within the three spatial dimensions.

3. A method of locating a three-dimensional model of an object as defined in claim 1 wherein the substantially rotationally and translationally invariant values are tensors of inertia determined in dependence upon the first model having a substantially uniform mass distribution.

4. A method of locating a three-dimensional model of an object as defined in claim 3 wherein the tensors of inertia are orthogonal to each other.

5. A method of locating a three-dimensional model of an object as defined in claim 4 further comprising the step of:
determining a relative eigen value for each tensor of inertia; and,
wherein an axis associated with a tensor of inertia is identified in dependence upon the determined eigen values.

6. A method of locating a three-dimensional model of an object as defined in claim 4 wherein the tensors of inertia are oriented in an identical fashion relative to the search model independent of orientation of the search model.

7. A method of locating a three-dimensional model of an object as defined in claim 6 wherein a tensor of inertia is oriented in dependence upon a value determined by analysing geometry of the model about a plane oriented at right angles to the tensor of inertia.

8. A method of locating a three-dimensional model of an object as defined in claim 1 wherein the step of determining substantially rotationally and translationally invariant values in dependence upon the first three-dimensional model comprises the steps of:
determining three tensors of inertia of the model that are orthogonal to each other in dependence upon the search model having a uniform mass distribution;
determining eigen values of the tensors of inertia;
identifying each tensor of inertia in dependence upon the eigen values; and,
in dependence upon geometric information of the model, orienting each tensor of inertia in one of the direction of the tensor of inertia and a second direction 180 degrees from the direction of the tensor of inertia.

9. A method of locating a three-dimensional model of an object as defined in claim 1 further comprising the step of providing weighting information to the processor, the weighting information relating to weighting of model scale and wherein the step of searching is conducted in further dependence upon the weighting information provided.

10. A method of locating a three-dimensional model of an object as defined in claim 8 further comprising the step of providing weighting information to the processor and wherein the step of searching is conducted in further dependence upon the weighting information.

11. A method of locating a three-dimensional model of an object in a database of scanned three-dimensional models of objects, predetermined characterisations thereof, and associations therebetween comprising the steps of:
providing a first three-dimensional search model of an object, the search model comprising data relating to each of three spatial dimensions;
determining values corresponding to the first three-dimensional model that are substantially rotationally and translationally invariant in the three spatial dimensions; and,
in dependence upon the rotationally and translationally invariant values, characterising the first three-dimensional search model to produce a plurality of search characterisations;
locating, with a processor, predetermined characterisations within the database in dependence upon the plurality of search characterisations; and,
providing, an indication of the scanned three dimensional model associated with the located predetermined characterisations, the model having data relating to each of three spatial dimensions.

12. A method of locating a three-dimensional model of an object in a database of scanned three-dimensional models of objects, predetermined characterisations thereof, and associations therebetween as defined in claim 11 wherein the located predetermined characterisations are similar within predetermined limits to the plurality of search characterisations.

13. A method of locating a three-dimensional model of an object as defined in claim 11 wherein the step of determining substantially rotationally and translationally invariant values corresponding to the first three-dimensional model comprises the steps of:
determining three orthogonal tensors of inertia of the model in dependence upon the search model having a uniform mass distribution;
determining eigen values of the tensors of inertia;
identifying each tensor of inertia that corresponds to the eigen values; and,
in dependence upon geometric information, orienting each tensor of inertia in one of the direction of the tensor of inertia and a second direction 180 degrees from the direction of the tensor of inertia.

14. A method of locating a three-dimensional model of an object in a database of scanned three-dimensional models of objects, predetermined characterisations thereof, and associations therebetween as defined in claim 11 further comprising the step of providing weighting information relating to search characterisations including scale to the processor and wherein the step of searching is conducted in further dependence upon the weighting information.

15. A method of locating a three-dimensional model of an object as defined in claim 1 wherein the first three-dimensional search model is a scanned image of an object having data relating to each of three spatial dimensions.

16. A method of locating a three-dimensional model of an object as defined in claim 1 wherein the step of providing a first three-dimensional search model comprises the steps of:

scanning an image of an object having data relating to each of three spatial dimensions; and, modifying the scanned three-dimensional image of an object.

17. A method of locating a three-dimensional model of an object as defined in claim 1 wherein the first three-dimensional search model comprises a portion of each of a plurality of three-dimensional search models having data relating to each of three spatial dimensions.

18. A method of locating a three-dimensional model of an object comprising the steps of:

providing a first three-dimensional search model of an object, the model comprising data relating to each of three spatial dimensions;

determining first values corresponding to the first three-dimensional model that are substantially rotationally and translationally invariant in the three spatial dimensions;

providing a second three-dimensional search model, the model comprising data relating to each of three spatial dimensions;

determining second values corresponding to the second three-dimensional model that are substantially rotationally and translationally invariant in the three spatial dimensions; and, using a processor, searching for models in a database associated with rotationally and translationally invariant values between the first substantially rotationally and translationally invariant values and the second substantially rotationally and translationally invariant values.

19. A method of locating a three-dimensional model of an object as defined in claim 18 wherein the step of determining first substantially rotationally and translationally invariant values that correspond to the first three-dimensional model comprises the steps of:

determining three orthogonal tensors of inertia of the first model in dependence upon the first search model having a uniform mass distribution;

determining eigen values of the tensors of inertia;

identifying each tensor of inertia in dependence upon the eigen values; and, in dependence upon geometric information, orienting each tensor of inertia in a first direction or in a second direction 180 degrees from the first direction; and, wherein the step of determining second substantially rotationally and translationally invariant values in dependence upon the first three-dimensional model comprises the steps of:

determining three orthogonal tensors of inertia of the second model in dependence upon the second search model having a uniform mass distribution;

determining eigen values of the tensors of inertia;

identifying each tensor of inertia in dependence upon the eigen values; and, in dependence upon geometric information, orienting each tensor of inertia in a first direction or in a second direction 180 degrees from the first direction.

20. A method of locating a three-dimensional model of an object as defined in claim 1 wherein the first three-dimensional search model further comprises colour information relating to the object's colour.

21. A method of locating a three-dimensional model of an object as defined in claim 1 wherein the substantially rotationally and translationally invariant values are tensors of inertia determined in dependence upon the first model.

22. A method of locating a three-dimensional model of an object as defined in claim 21 wherein the tensors of inertia are linearly independent with respect to each other.

23. A method of locating a three-dimensional model of an object as defined in claim 4 further comprising the step of:

determining a relative singular value for each tensor of inertia; and, wherein an axis associated with a tensor of inertia is identified in dependence upon the determined singular values.

* * * * *